(12) United States Patent
Sorkin

(10) Patent No.: US 11,927,011 B2
(45) Date of Patent: Mar. 12, 2024

(54) CLOSURE LOAD PLUG

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 0 days.

(21) Appl. No.: 17/228,186

(22) Filed: Apr. 12, 2021

(65) Prior Publication Data

US 2021/0324630 A1 Oct. 21, 2021

Related U.S. Application Data

(60) Provisional application No. 63/010,319, filed on Apr. 15, 2020.

(51) Int. Cl.
*E04C 5/10* (2006.01)
*F16L 25/00* (2006.01)

(52) U.S. Cl.
CPC ............ *E04C 5/10* (2013.01); *F16L 25/0018* (2013.01); *F16L 25/0054* (2013.01)

(58) Field of Classification Search
CPC ..... E04C 5/10; F16L 25/0018; F16L 25/0054; F16L 25/0036
See application file for complete search history.

(56) References Cited

U.S. PATENT DOCUMENTS

| | | |
|---|---|---|
| 191,768 A | 6/1877 | Matheson |
| 551,733 A | 12/1895 | Mullenhoff |
| 913,484 A | 2/1909 | Fairfall |
| 1,671,458 A | 5/1928 | Wilson |
| 1,853,411 A | 4/1932 | Gentry et al. |
| 1,999,706 A | 4/1935 | Spang |
| 2,079,692 A | 5/1937 | Lapointe |
| 2,127,284 A | 8/1938 | Board |
| 2,211,179 A | 8/1940 | Stone |
| 2,475,322 A | 7/1949 | Horton et al. |
| 2,574,081 A | 11/1951 | Abegg |
| 2,783,809 A | 3/1957 | Haines |
| 3,813,115 A | 5/1974 | French |
| 3,873,138 A | 3/1975 | Griffiths |
| 4,140,422 A | 2/1979 | Crumpler, Jr. et al. |
| 4,456,288 A | 6/1984 | Conner |
| 4,603,889 A | 8/1986 | Brooks |
| 4,643,466 A | 2/1987 | Conner |
| 4,648,633 A | 3/1987 | Bergmann |
| 4,706,997 A | 11/1987 | Carstensen |

(Continued)

FOREIGN PATENT DOCUMENTS

| | | |
|---|---|---|
| FR | 1377585 A | 11/1964 |
| WO | 2010025877 A | 3/2010 |
| WO | 2015178957 A1 | 11/2015 |

OTHER PUBLICATIONS

International Preliminary Report on Patentability for PCT/US2014/066571 dated Nov. 22, 2016 (9 pages).

(Continued)

*Primary Examiner* — Patrick J Maestri
(74) *Attorney, Agent, or Firm* — Hunton Andrews Kurth LLP

(57) ABSTRACT

A closure assembly includes a section of duct, a duct coupler assembly, a closure load plug, and an end cap. The duct coupler assembly is fit against the section of duct. The closure load plug is mechanically connected to the duct coupler assembly. The end cap is mechanically connected to the closure load plug.

8 Claims, 4 Drawing Sheets

(56) References Cited

U.S. PATENT DOCUMENTS

| | | | |
|---|---|---|---|
| 4,708,370 A | 11/1987 | Todd | |
| 4,836,580 A | 6/1989 | Farrell | |
| 5,078,432 A | 1/1992 | Seiter | |
| 5,137,306 A | 8/1992 | Flood | |
| 5,320,319 A | 6/1994 | Luthi | |
| 5,356,181 A | 10/1994 | Shirogane et al. | |
| 5,474,335 A | 12/1995 | Sorkin | |
| 5,707,088 A | 1/1998 | Miller et al. | |
| 5,775,849 A | 7/1998 | Sorkin | |
| 5,799,703 A | 9/1998 | Kanao et al. | |
| 5,799,989 A * | 9/1998 | Albino | F16L 19/048 |
| | | | 285/903 |
| 5,842,727 A | 12/1998 | Shade | |
| 5,887,909 A | 3/1999 | Tokuda | |
| 5,921,592 A | 7/1999 | Donnelly | |
| 5,954,373 A | 9/1999 | Sorkin | |
| 6,206,433 B1 | 3/2001 | Bloomer | |
| 6,322,110 B1 | 11/2001 | Banker et al. | |
| 6,425,608 B1 | 7/2002 | Nordstrom | |
| 6,550,816 B1 | 4/2003 | Sorkin | |
| 6,659,135 B2 | 12/2003 | Sorkin | |
| 6,666,233 B1 | 12/2003 | Sorkin | |
| 6,676,173 B2 | 1/2004 | Donnelly | |
| 6,752,435 B1 | 6/2004 | Sorkin | |
| 6,764,105 B1 * | 7/2004 | Sorkin | F16L 25/0027 |
| | | | 52/223.13 |
| 6,773,039 B2 | 8/2004 | Muenster et al. | |
| 6,834,890 B2 | 12/2004 | Sorkin | |
| 6,843,031 B1 | 1/2005 | Sorkin | |
| 6,874,821 B1 | 4/2005 | Sorkin | |
| 6,889,714 B1 | 5/2005 | Sorkin | |
| 7,267,375 B1 | 9/2007 | Sorkin | |
| 7,273,238 B1 | 9/2007 | Sorkin | |
| 7,591,059 B2 | 9/2009 | MacAulay et al. | |
| 7,621,103 B1 | 11/2009 | Sorkin | |
| 7,686,347 B1 | 3/2010 | Sorkin | |
| 7,695,021 B1 | 4/2010 | Sorkin | |
| 8,016,326 B1 | 9/2011 | Sorkin | |
| 8,398,123 B1 | 5/2013 | Sorkin | |
| 8,640,292 B1 | 2/2014 | Sorkin | |
| 9,399,869 B2 | 7/2016 | Sorkin | |
| 9,423,059 B1 | 8/2016 | Sorkin | |
| 9,493,951 B2 | 11/2016 | Sorkin | |
| 2003/0034651 A1 | 2/2003 | Neubauer et al. | |
| 2003/0098586 A1 | 5/2003 | Donnelly | |
| 2003/0132632 A1 | 7/2003 | Schooned | |
| 2004/0155463 A1 * | 8/2004 | Moner | F16L 25/0036 |
| | | | 285/903 |
| 2005/0285399 A1 | 12/2005 | Mosing et al. | |
| 2007/0252389 A1 | 11/2007 | Milici et al. | |
| 2010/0301596 A1 | 12/2010 | Amann et al. | |
| 2011/0179590 A1 | 7/2011 | Kilmas | |
| 2012/0024119 A1 * | 2/2012 | Aldy | F16G 11/02 |
| | | | 29/419.1 |
| 2012/0298248 A1 | 11/2012 | Schwager et al. | |
| 2014/0145434 A1 * | 5/2014 | Oh | F16L 19/083 |
| | | | 285/354 |
| 2014/0367961 A1 | 12/2014 | Crigler et al. | |
| 2015/0097369 A1 | 4/2015 | Bernardo | |
| 2015/0211665 A1 | 7/2015 | Sorkin | |
| 2015/0330078 A1 | 11/2015 | Sorkin | |

OTHER PUBLICATIONS

Extended European Search Report issued in EP Patent App. No. 17151184.3, dated Apr. 25, 2017 (7 pages).

Krauser, Larry B., "Post-Tensioning Tendon Protection Strategies for Precast Elements", 2009.

Almer, Kevin L., "Precast Beams with Cast-in-Place Connections", Jan. 22, 2013.

Moore, Andrew, "Shear Behavior of Spliced Post-Tensioned Girders", Aug. 2014, Published Apr. 2015.

Mary, Beth D., "Continuous Prestressed Concrete Girder Bridges vol. 2: Analysis, Testing, and Recommendations", Dec. 2016.

Krauser, Larry B., "Achieving Protection of Internal Tendons Through Continuous Duct Enclosures in Segmental Bridge Construction", 2011.

Williams, Chris, "Behavior of the Splice Regions of Spliced I-Girder Bridges", Feb. 2015, Published Mar. 2015.

Dywidag, "Post-Tensioning Systems Multistrand Systems Bar Systems Repair and Strengthening", Apr. 2006.

Krauser, Larry B., "Improved Performance Using Corrugated Plastic Duct in Tight-Radius Post-Tensioning Applications", 2011.

Matt, Peter, "Durability of Post-Tensioning Tendons", Nov. 2007.

Communication pursuant to Article 94(3) EPC dated Dec. 15, 2022 issued in EP 21168175.4.

* cited by examiner

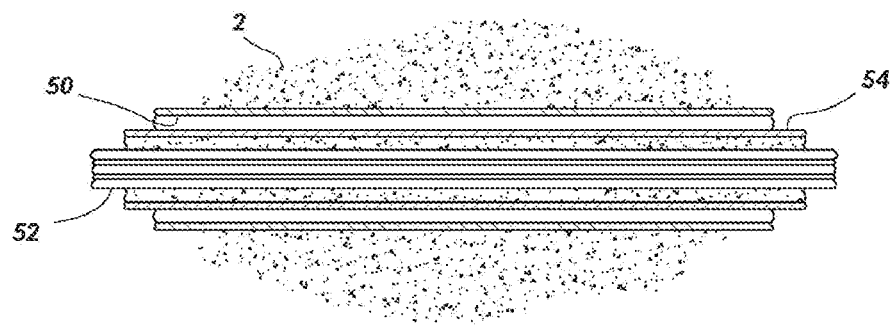
FIG.1 - PRIOR ART
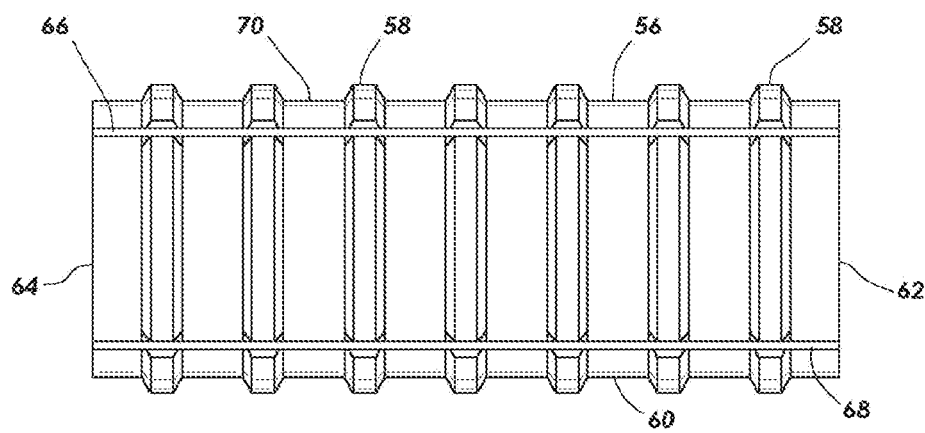
FIG.2 - PRIOR ART

CLOSURE LOAD PLUG

CROSS-REFERENCE TO RELATED APPLICATIONS

This application is a nonprovisional application which claims priority from U.S. provisional application No. 63/010,319, filed Apr. 15, 2020, which is incorporated by reference herein in its entirety.

Technical Field/Field of the Disclosure

The present disclosure relates generally to post-tensioned, pre-stressed concrete construction. The present disclosure relates specifically to an apparatus and process for use in connecting segments of duct.

BACKGROUND OF THE DISCLOSURE

Many structures are built using concrete, including, for instance, buildings, parking structures, apartments, condominiums, hotels, mixed-use buildings, casinos, hospitals, medical buildings, government buildings, research/academic institutions, industrial buildings, malls, bridges, pavement, tanks, reservoirs, silos, foundations, sports courts, and other structures.

Pre-stressed concrete is structural concrete in which internal stresses are introduced to reduce potential tensile stresses in the concrete resulting from applied loads. This can be accomplished by two methods—post-tensioned pre-stressing and pre-tensioned pre-stressing. When post tensioning concrete, the pre-stressing assembly is tensioned after the concrete has attained a specified strength. The pre-stressing assembly, commonly known as a tendon, may include for example and without limitation, anchorages, one or more strands, and sheathes or ducts. The strand is tensioned between anchors which are embedded in the concrete once the concrete has hardened.

Multiple tendons are used in the post-tensioned concrete and may extend through ducts within the concrete structure. As shown in FIG. 1, concrete sections 2 are formed with ducts 50 at locations where the post-tensioning cables passed through the concrete structure. Tendons 52 in FIG. 4 are routed through the ducts 50. One form of duct is shown in FIG. 2. Duct 56 has a plurality of corrugations 58 extending radially outwardly from the tubular body 60. Duct 56 has ends 62 and 64 through which post-tensioning cables extend. Longitudinal channels 66, 68 and 70 extend along the outer surface of tubular body 60. Longitudinal channels 66, 68 and 70 allow grout that is introduced into the interior of duct 56 to flow through the interior of duct 56. Longitudinal channels 66, 68 and 70 also add structural integrity to duct 56.

Ends 62 and 64 of duct 56 may be difficult to seal to the next segment of duct 56. Conventionally, the duct 56 segments are joined together in end-to-end relationship by applying epoxy to the matching ends 62 and 64. Epoxy may flow or become extruded into the opening at the ends 62 and 64 of the duct when the segments are connected. In other circumstances, grout is pumped through the interior passageway of duct 56 to seal against the intrusion of air and water into the interior of duct 56. The grout is pumped through the interior of the ducts. When segments of duct 56 are joined, the epoxy may leak out into the interface area between the segments and will not flow fully through the entire duct assembly. Once again, an incomplete grouting of the interior of duct 56 may occur.

Segments of duct 56 are typically formed in standard lengths that may not correspond with the length of a concrete pour.

SUMMARY

The present disclosure provides for a closure assembly. The closure assembly includes a section of duct. The closure assembly includes a duct coupler assembly, the duct coupler assembly fit against the section of duct. The closure assembly includes a closure load plug, the closure load plug mechanically connected to the duct coupler assembly. The closure assembly includes an end cap, the end cap mechanically connected to the closure load plug.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a diagrammatic cross-sectional view showing routing of a tendon through the duct within a concrete segment.

FIG. 2 is a side elevational view of duct.

DETAILED DESCRIPTION

Figure 3:
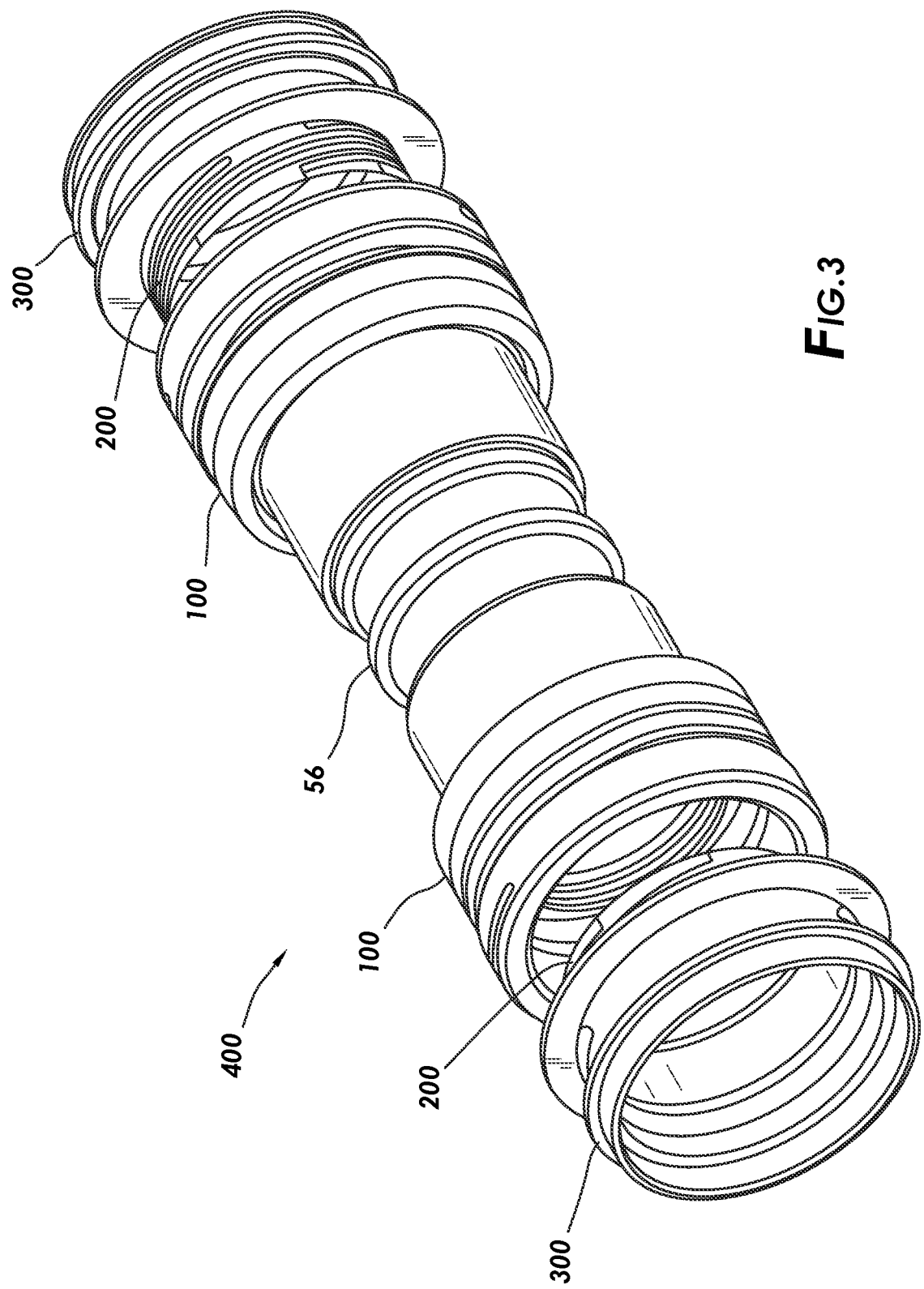
FIG. 3 is a perspective exploded view of duct coupler having a closure load plug consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 4:
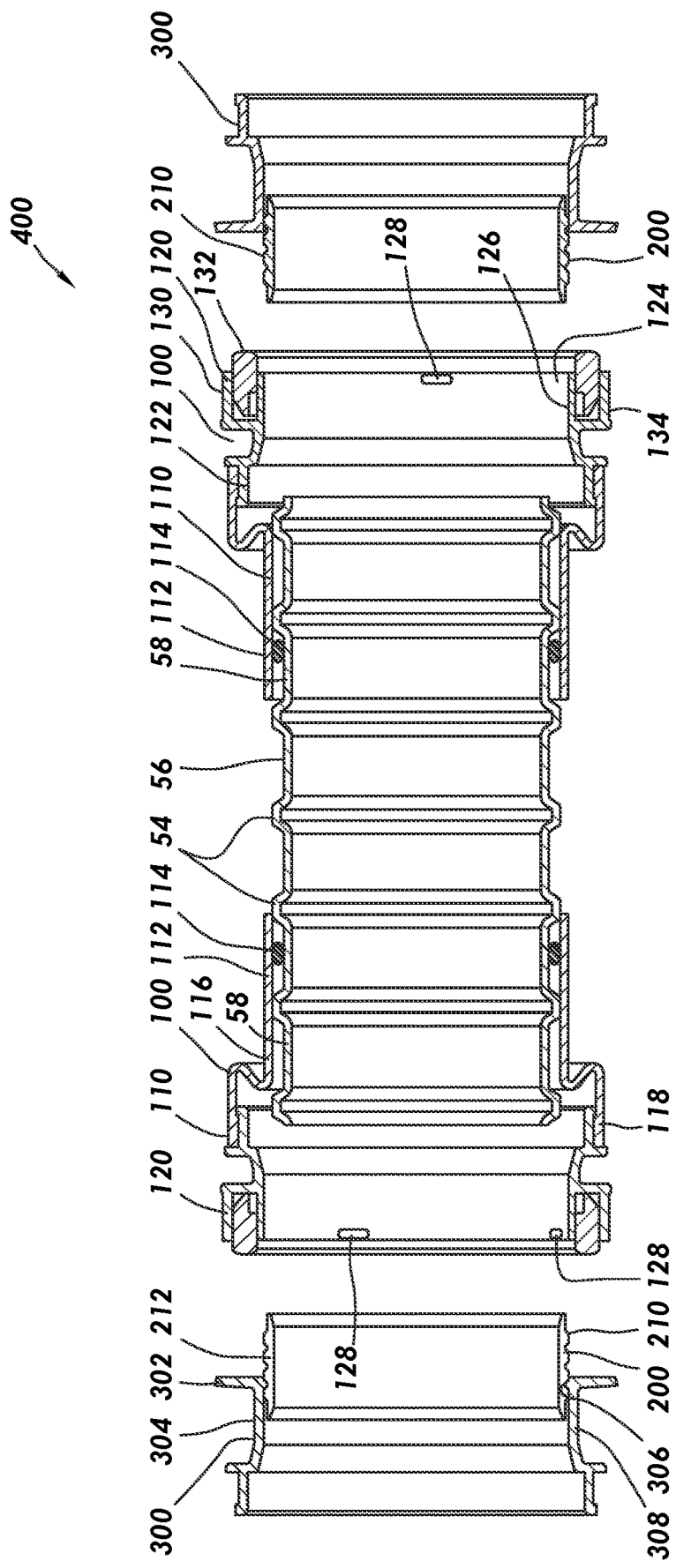
FIG. 4 is a cross-sectional view of the duct coupler of FIG. 3.

FIGS. 3 and 4 depict closure assembly 400, which includes a section of duct 56, duct coupler assemblies 100, closure load plug 200, and end cap 300, for use in post tensioning concrete. Duct coupler assemblies 100 are adapted to receive duct 56. Duct coupler assemblies 100 include duct receiving end 110 and a coupler end 120. Duct receiving end may be formed having cylindrical portion 116 and a conjunction portion 118 for attachment to coupler end 120. In certain embodiments, cylindrical portion 116 and conjunction portion 118 are a single piece. Duct receiving end 110 may include inner surface 112 that is adapted to press against corrugations 58, thereby holding duct coupler assembly 100 against ribs 54 of duct 56, such as by friction. Duct coupler assembly may further include duct gasket 114 positioned on inner surface 112 to prevent or retard intrusion of liquids or gases into the interior of duct 56.

Coupler end 120 may be tubular or generally tubular and may include lip 122. Lip 122 may be mechanically coupled to or integrally formed with conjunction portion 118. Coupler end 120 may further include female coupler 124 attached or formed integrally with lip 122. Female coupler 124 may include inside surface 126 having female threads 128. Coupler end 120 may further include gasket groove 130 in which coupler gasket 132 is positioned. Gasket groove 130 may be formed by gasket lip 134 positioned outside female coupler 124.

Figure 5:
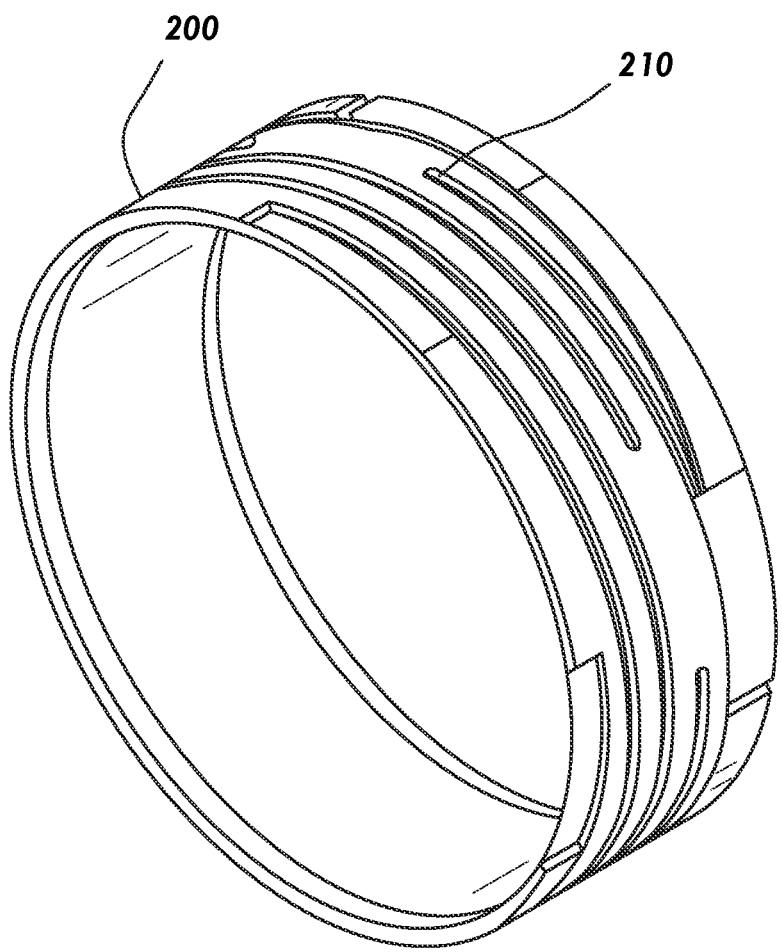
FIG. 5 is a perspective view of a closure load plug consistent with at least one embodiment of the present disclosure.

Female coupler 124 may be adapted to receive closure load plug 200. As shown in FIGS. 4 and 5, closure load plug 200 may be a cylinder having male threads 210 positioned on outside surface 212. In use, closure load plug 200 may be screwed into female coupler 124 by mating male threads 210 to female threads 128.

In certain embodiments, end cap 300 may be mechanically coupled to closure load plug 200. End cap 300 may be adapted to fit against a form board for formation of a concrete segment. End cap 300 may be tubular or generally tubular, having gasket face 302 formed as part of outer surface 304 of end cap 300. When in use, gasket face 302 may abut coupler gasket 132, forming a seal between duct coupler assembly 100 and end cap 300. End cap 300 may include female threads 306 positioned on inside surface 308 of end cap 300. In use, closure load plug 200 may be screwed into end cap 300 by mating male threads 210 to female threads 306.

In certain embodiments, closure assembly 400 may be used for concrete pours for post tension concrete segments having lengths that are different than standard lengths of duct, called "short pours." In short pours, typically formed between a form board and a standard length of duct, closure assembly 400 may be used to extend duct 56 to the form board. For example, duct 56 may be cut to length and duct coupler assemblies 100 attached to the shorter length duct. Closure load plug 200 may be used as an extension to the combination of duct coupler assembly 100 and duct 56 to position closure assembly 400 against a form board.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A closure assembly comprising:
a section of duct;
a duct coupler assembly, the duct coupler assembly fit against the section of duct;
a closure load plug, the closure load plug mechanically connected to the duct coupler assembly; and
an end cap, the end cap mechanically connected to the closure load plug, wherein the closure load plug has an outer surface, the outer surface of the closure load plug including male threads and wherein the duct coupler assembly has an inner surface, the inner surface of the duct coupler assembly including female threads.

2. The closure assembly of claim 1, wherein the duct coupler assembly is friction fit against the section of duct.

3. The closure assembly of claim 1, wherein the male threads of the closure load plug and the female threads of the duct coupler assembly are mated to mechanically connect the closure load plug to the duct coupler assembly.

4. The closure assembly of claim 3, wherein the end cap includes female threads on an inner surface of the end cap.

5. The closure assembly of claim 4, wherein the female threads on the inner surface of the end cap are mated to the male threads of the closure load plug to mechanically connect the end cap to the closure load plug.

6. A closure assembly comprising:
a section of duct;
a duct coupler assembly, the duct coupler assembly fit against the section of duct;
a closure load plug, the closure load plug mechanically connected to the duct coupler assembly; and
an end cap, the end cap mechanically connected to the closure load plug, wherein the duct coupler assembly further includes a gasket lip on an outer surface of the duct coupler assembly, the gasket lip forming a gasket groove, wherein a gasket is positioned in the gasket groove.

7. The closure assembly of claim 6, wherein the end cap includes a gasket face formed as part of an outer surface of the end cap.

8. The closure assembly of claim 7, wherein the gasket abuts the gasket face forming a seal.

\* \* \* \* \*